United States Patent
Denney et al.

(10) Patent No.: US 11,132,441 B2
(45) Date of Patent: Sep. 28, 2021

(54) SYSTEMS AND METHODS FOR INHIBITING THREATS TO A COMPUTING ENVIRONMENT

(71) Applicants: Kyle Denney, Miami, FL (US); Enes Erdin, Miami, FL (US); Leonardo Babun, Miami, FL (US); A. Selcuk Uluagac, Miami, FL (US); Kemal Akkaya, Miami, FL (US)

(72) Inventors: Kyle Denney, Miami, FL (US); Enes Erdin, Miami, FL (US); Leonardo Babun, Miami, FL (US); A. Selcuk Uluagac, Miami, FL (US); Kemal Akkaya, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 16/857,401

(22) Filed: Apr. 24, 2020

(65) Prior Publication Data
US 2020/0356665 A1   Nov. 12, 2020

Related U.S. Application Data

(60) Provisional application No. 62/843,974, filed on May 6, 2019.

(51) Int. Cl.
*G06F 21/55*   (2013.01)
*G06N 20/20*   (2019.01)
(Continued)

(52) U.S. Cl.
CPC .......... *G06F 21/55* (2013.01); *G06F 21/6218* (2013.01); *G06N 5/003* (2013.01);
(Continued)

(58) Field of Classification Search
CPC ............... G06F 21/6218; G06F 21/55; G06F 2221/034; G06F 221/034; G06N 20/20; G06N 5/003; G06N 5/04
See application file for complete search history.

(56) References Cited

U.S. PATENT DOCUMENTS 9,245,147 B1 * 1/2016 Williams .............. G06F 21/55
2009/0292924 A1 * 11/2009 Johnson ............... G06F 21/316
                                                                                        713/176
(Continued)

OTHER PUBLICATIONS

Dave (Jing) Tian et al., Defending Against Malicious USB Firmware with GoodUSB, Proceedings of the 31st Annual Computer Security Applications Conference, ser. ACSAC 2015, pp. 261-270.
(Continued)

*Primary Examiner* — Harunur Rashid
(74) *Attorney, Agent, or Firm* — Saliwanchik, Lloyd & Eisenschenk

(57) ABSTRACT

Novel hardware-based frameworks and methods for the detection and inhibition or prevention of insider threats utilizing machine learning methods and data collection done at the physical layer are provided. Analysis is done on unknown USB-powered devices, such as a keyboard or mouse, introduced to a computing environment and, through the utilization of machine learning, the behavior of the unknown device is determined before it can potentially cause harm to the computing environment.

20 Claims, 9 Drawing Sheets

(51) Int. Cl.
  *G06N 5/04*    (2006.01)
  *G06F 21/62*   (2013.01)
  *G06N 5/00*    (2006.01)

(52) U.S. Cl.
  CPC .............. *G06N 5/04* (2013.01); *G06N 20/20* (2019.01); *G06F 2221/034* (2013.01)

(56) References Cited

U.S. PATENT DOCUMENTS

| | | |
|---|---|---|
| 2011/0030030 A1 | 2/2011 | Terpening et al. |
| 2012/0110217 A1* | 5/2012 | Christiansen ......... G06F 11/349 710/15 |
| 2012/0240234 A1 | 9/2012 | Lomont et al. |
| 2013/0031629 A1* | 1/2013 | Srivastava .............. G06F 21/85 726/22 |
| 2014/0090061 A1 | 3/2014 | Avasarala et al. |
| 2014/0337558 A1 | 11/2014 | Powers et al. |
| 2016/0373408 A1 | 12/2016 | Wentworth et al. |
| 2017/0116399 A1* | 4/2017 | Samzelius ............. G06F 21/316 |
| 2019/0080089 A1* | 3/2019 | Chen .................... G06F 21/563 |
| 2019/0098032 A1* | 3/2019 | Murphey .............. G06F 9/4498 |
| 2019/0347518 A1* | 11/2019 | Shrestha ............. G06K 9/00362 |
| 2020/0104511 A1* | 4/2020 | Stolfo .................... H04L 67/38 |
| 2020/0226298 A1* | 7/2020 | Appleboum ........ G06F 11/3684 |

OTHER PUBLICATIONS

Dave (Jing) Tian et al. Making USB Great Again with USBFILTER, Proceedings of the 25th USENIX The Advanced Computing Systems Association Security Symposium, Aug. 2016, pp. 415-430.

\* cited by examiner

```
#Delay initial attack by 3 seconds.
DELAY 3000

#Open terminal
ALT F2
DELAY 500
STRING xterm
DELAY 500
ENTER

DELAY 1000
STRING cd $HOME
STRING rm -r ./Documents
STRING Your documents were deleted!
```

FIG. 9

```
import random
w = "inject.txt"

def human_like(text):
    for i in range(0, len(text)):
        r = random.randrange(minThreshold, maxThreshold)
        w.write("DELAY %s\n" % r)
        w.write("STRING %s\n" % text[i])

w = open(w, "w")
w.write("DELAY 1000\n")
w.write("ALT F2\n")
w.write("DELAY 500\n")
human_like("xterm")

human_like("cd $HOME")
w.write("DELAY 500\n")

human_like("rm -r ./Documents")
w.write("DELAY 500\n")

human_like("Your documents were deleted!")
w.write("DELAY 500\n")
```

FIG. 10

SYSTEMS AND METHODS FOR INHIBITING THREATS TO A COMPUTING ENVIRONMENT

CROSS-REFERENCE TO A RELATED APPLICATION

This application claims the benefit of U.S. Provisional Application Ser. No. 62/843,974, filed May 6, 2019, which is hereby incorporated by reference herein in its entirety, including any figures, tables, and drawings.

GOVERNMENT SUPPORT

This invention was made with government support under Grant Number NSF-1663051 awarded by National Science Foundation. The government has certain rights in the invention.

BACKGROUND

Sensitive computing environments (e.g., government laboratories, corporate offices, military institutions, etc.) that harbor critical infrastructure and highly confidential information are key targets for cyber threats. Although institutions invest considerably to protect their data from possible outsider attacks, insiders are still a distrustful source for potential attacks. There is currently little to be done should a malicious insider insert a device (e.g., USB device) with the intent to steal or cause harm to a sensitive computing environment.

Information assurance is typically provided by logging the activities or limiting the abilities of users via software-based solutions at the operating system level (e.g., file activity monitoring software). Although the software-based loggers are useful in many ways, like ease of implementation, maintenance, or interoperability, an attacker with enough motivation and skills can circumvent such defensive barriers. In fact, defensive software products have deficiencies in theory. First, they are implemented on proprietary hardware. One cannot verify full trust unless the full design details of the hardware being used are known. Second, in a computing system the software and the operating system used are important such that all low level protocols are implemented in the operating system and are brought into use as libraries or kernel-level modules; those libraries can easily be modified by malware or viruses. Third, the configuration of the software tools is also important; for example, a misconfiguration of a single firewall will cause catastrophic results when attacked. Indeed, every company is vulnerable to being hacked.

BRIEF SUMMARY

Embodiments of the subject invention provide novel hardware-based frameworks and methods for the detection and inhibition or prevention of insider threats utilizing machine learning methods and data collection done at the physical layer. Embodiments aim to analyze unknown universal serial bus (USB)-powered devices (e.g., keyboard, mouse, etc.) introduced to a computing environment and, through the utilization of machine learning, determine the behavior of the unknown device before it can potentially cause harm to the computing environment.

In an embodiment, a system for the detection and inhibition or prevention of insider threats to a computing environment (e.g., to which the system is connected) can comprise a hardware bus having instructions stored thereon that, when executed, perform the following steps: collect data from incoming signals from an external device connected to the hardware bus; perform pre-processing on the data from the incoming signals to recreate protocol data packets of the external device; extract information about the external device from the recreated protocol data packets; classify the external device as benign or malicious based on the extracted information; if the external device is classified as malicious, prevent the external device from transmitting the incoming signals to the computing environment; and if the external device is classified as benign, allow the external device to transmit the incoming signals to the computing environment. The information can comprise information about at least one feature of keystroke-like actions of the external device, and the at least one feature can comprise at least one of key transition time (KTT), duration held, normalized KTT, and normalized duration held. The external device can be classified as malicious if the KTT of any keystroke-like action of the external device is less than a first minimum threshold time (e.g., 80 milliseconds (ms)) and/or if the duration held of any keystroke-like action of the external device is less than a second minimum threshold time. The instructions can also create a whitelist of known benign devices having a KTT of less than the first minimum threshold, and if an external device is on the whitelist, it will not be classified as malicious if its KTT is less than the first minimum threshold (unless it meets other criteria to be classified as malicious). The external device can be classified as benign if the KTT of all keystroke-like actions of the external device is greater than or equal to the first minimum threshold time and the duration held of all keystroke-like actions of the external device is greater than or equal to the second minimum threshold time. The external device can be a USB device, such as a USB keyboard, USB mouse, USB storage device, or USB adapter. The classifying of the external device as benign or malicious can comprise using machine learning (e.g., a decision tree, a random forest, Naive Bayes, k-nearest neighbors, or a support vector machine) on the extracted information.

In another embodiment, a method for the detection and inhibition or prevention of insider threats to a computing environment (e.g., to which a hardware bus is connected) can comprise: collecting (e.g., by the hardware bus) data from incoming signals from an external device connected to the hardware bus; performing (e.g., by the hardware bus) pre-processing on the data from the incoming signals to recreate protocol data packets of the external device; extracting (e.g., by the hardware bus) information about the external device from the recreated protocol data packets; classifying (e.g., by the hardware bus) the external device as benign or malicious based on the extracted information; if the external device is classified as malicious, preventing (e.g., by the hardware bus) the external device from transmitting the incoming signals to the computing environment; and if the external device is classified as benign, allowing (e.g., by the hardware bus) the external device to transmit the incoming signals to the computing environment. The method can further comprise creating a whitelist of known benign devices having a key transition time (KTT) of less than a first minimum threshold (e.g., 80 ms). The information can information about at least one feature of keystroke-like actions of the external device, and the at least one feature can comprise KTT and duration held (and possibly normalized KTT and/or normalized duration held). The external device can be classified as malicious if the KTT of any keystroke-like action of the external device is less than the first minimum threshold time and the external device is not on the whitelist, and/or if the duration held of any keystroke-like action of the external device is less than a second minimum threshold time. The external device can be classified as benign if the KTT of all keystroke-like actions of the external device is greater than or equal to the first minimum threshold time and the duration held of all keystroke-like actions of the external device is greater than or equal to the second minimum threshold time. The external device can be, for example, a USB keyboard, USB mouse, USB storage device, or USB adapter. The classifying of the external device as benign or malicious can comprise using machine learning (e.g., a decision tree, a random forest, Naive Bayes, k-nearest neighbors, or a support vector machine) on the extracted information.

BRIEF DESCRIPTION OF DRAWINGS

FIG. 9 shows code for an example of a Rubber Ducky attack.

FIG. 10 shows Python script for a Rubber Ducky mimicry attack.

DETAILED DESCRIPTION

Embodiments of the subject invention provide novel hardware-based frameworks and methods for the detection and inhibition or prevention of insider threats utilizing machine learning methods and data collection done at the physical layer. Embodiments aim to analyze unknown universal serial bus (USB)-powered devices (e.g., keyboard, mouse, etc.) introduced to a computing environment and, through the utilization of machine learning (e.g., one or more of decision tree, random forest, Naive Bayes, k-nearest neighbors, and support vector machines), determine the behavior of the unknown device before it can potentially cause harm to the computing environment. For example, decision tree and/or random forest can be used as machine learning.

All interconnected devices need a data protocol (e.g., USB) in which to effectively communicate. Therefore, each device needs a piece of hardware (commonly referred to as a 'bus') in which to transmit and receive communication utilizing such a data protocol. Embodiments of the subject invention aim to improve upon these hardware buses to create a "smart" bus that can determine the nature of an unknown connected USB-powered device (e.g., keyboard) communicating with the host machine. If the hardware bus determines the unknown device is malicious or abnormal, the bus can cease communication with the device until the user prompts the bus to re-establish communication with the external device.

Figure 1:
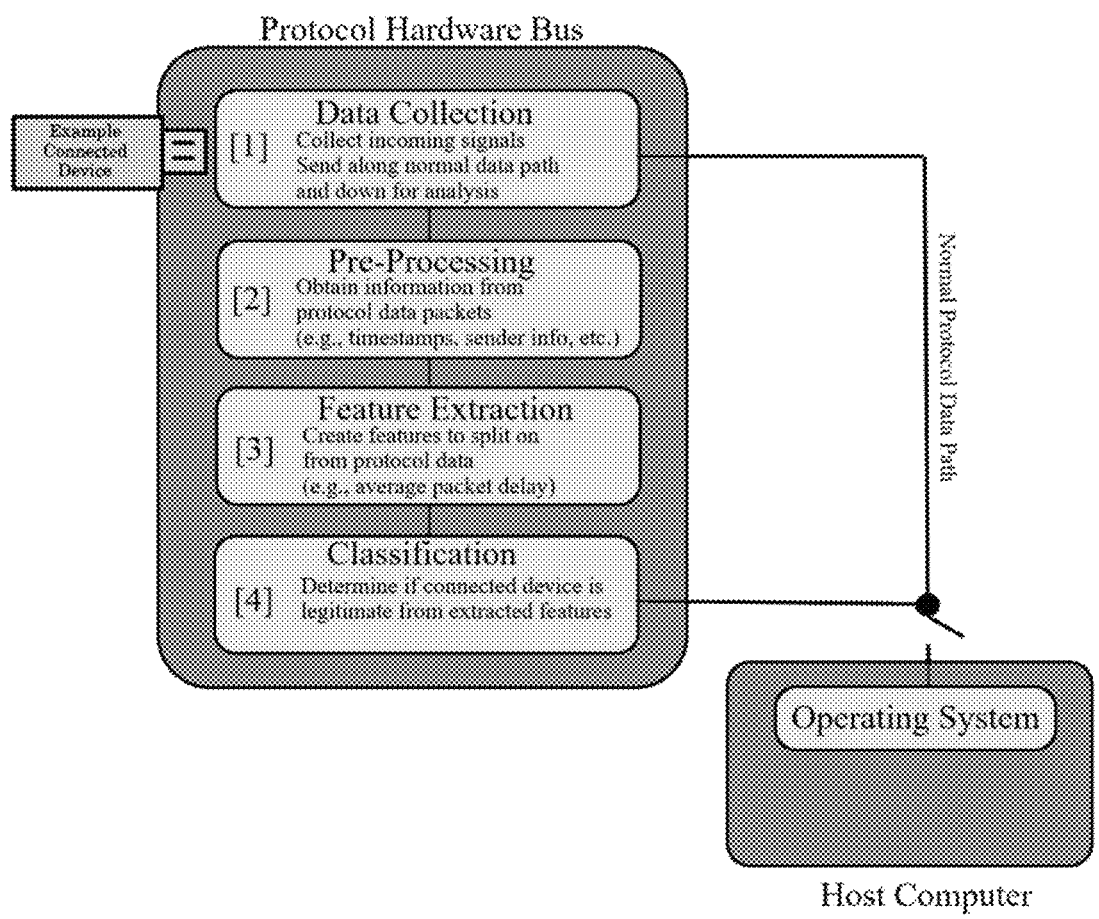
FIG. 1 shows a block diagram of an architecture according to an embodiment of the subject invention.

FIG. 1 shows a block diagram of an architecture according to an embodiment of the subject invention. Referring to FIG. 1, the architecture can be divided into four main parts: data collection; pre-processing; feature extraction; and classification. An unknown USB-powered device (e.g., USB keyboard) first must establish connection with the hardware bus; this can be either a physical insertion or wireless connection depending on the purpose of the communication protocol. The hardware bus transmits the raw protocol signals along the normal data path to the end computer, and collects the signals for internal analysis (step [1]). The hardware bus then collects relevant information from the signals (e.g., timestamps, sender information, etc.) (step [2]). In step [3], features are extracted in such a way that the hardware bus can successfully distinguish the nature of the device from the incoming data (e.g., typing frequency, duration of communication, etc.). Then, the bus uses these features to construct a classification model to determine the connected device's legitimacy (step [4]). If the device is indeed malicious or abnormal, the bus ceases communication on the normal protocol data path and the connected device can no longer continue its attack.

The key benefit of utilizing hardware to collect and process incoming traffic is two-fold. First, the data collector being hardware-based grants the ability of the collector to collect any possible malicious activity. Indeed, while a malicious device could hide itself from data collecting software in an operating system (OS), it would be unable to hide itself from data collection done at the hardware level. A secondary benefit of utilizing this hardware mechanism is that much of the processing is taken away from the user's end device. Machine learning approaches consume considerable computation, and moving these processes to an independent processor frees up resources on the host computer.

Detection schemes can be used to detect and inhibit (or prevent) keystroke-injection attacks, where a malicious USB device inserts malicious commands by imitating a user's keyboard. Embodiments show very promising results as below. A decision tree classifier can use keypress duration and keystroke transition times to determine the nature of the unknown USB device. Results show a classifier that can accurately distinguish human and machine typing behaviors with a precision of 0.89, indicating a viable and successful approach.

While some embodiments can detect rapid-keyboard keystroke attacks on USB devices, other embodiments can allow for more nuanced behavioral detection across a wide variety of USB-powered devices (e.g., mouse, flash storage, Bluetooth adapter, etc.). Refinement and further training of classification models can allow it to detect more sophisticated attacks among these varying USB-powered device types. Additionally, while USB may be the most popular device protocol, it is not the only one. Embodiments can be generalized to any standardized hardware bus to collect and analyze unknown devices using any number of data protocols (e.g., Wi-Fi, Bluetooth, etc.).

Applications of embodiments of the subject invention include, but are not necessarily limited to, OS-independent intrusion detection systems, heterogeneous systems, software-based compromised systems, behavioral analysis of external USB-powered devices, and relaxation of security policies inside critical systems. These will now be discussed in more detail.

OS-Independent Intrusion Detection Systems:

modern networks integrate with devices (e.g., switches, servers, personal computers, mobile devices, etc.) that utilize different operating systems. Current intrusion detection solutions that rely on software must implement a specific solution for every different device and OS. Embodiments of the subject invention include a generalized hardware-based solution that is independent of the OS utilized.

Heterogeneous Systems:

Embodiments of the subject invention are scalable and can be applied to systems with a large variety of device types.

Software-Based Compromised Systems:

When systems are considered compromised, software-based solution cannot be trusted in most cases against powerful adversaries such as Trojans. Embodiments of the subject invention can constitute a secure way to evaluate access to software-based compromised systems.

Behavioral Analysis of External USB Powered Devices:

With embodiments of the subject invention, it is possible to analyze the behavior an unknown, USB-powered device and determine its intent. In the case of a rogue device being inserted into a computing system, embodiments of the subject invention can quickly detect its behavior and inhibit or prevent further misuse by disabling the functionality of the device. The behavior of USB keyboard devices can be analyzed, and embodiments of the subject invention can be retrofitted to analyze any number of USB-powered devices (e.g., mouse, Bluetooth adapter, flash storage, etc.). Though USB protocol is discussed extensively herein, embodiments of the subject invention can be used with any data protocol that communicates through a hardware bus (e.g., Wi-Fi).

Relaxation of Security Policies Inside Critical Systems:

Embodiments of the subject invention allow access to sensitive networks via external devices in cases where it is restricted or even strictly prohibited by current security policies. Embodiments of the subject invention can detect a malicious device before any damage should occur to the devices in the network.

In Tian et al. (D. J. Tian, N. Scaife, A. Bates, K. Butler, and P. Traynor, "Making USB great again with USBFILTER," in 25th USENIX Security Symposium, 2016, pp. 415-430), a kernel module, called netfilter, is implemented as a firewall. In this approach the Linux OS is protected by the TPM (trusted platform module) for preventing alterations on the OS. The idea is adding rules similar to netfilter kernel module, which has already implemented in Linux kernel for years. If a user with root privileges has access to the system, he/she can change the rules or the module. For a powerful attacker this implementation has limited to no capability. In Fisk (R. Fisk.; 2017; The usg is good, not bad; [Online], the designer connected two microprocessors back-to-back to block the network capability of the USB devices. The implementation is capable of only limiting network type of enumerations and only works for the USB 1.0 standard.

Embodiments of the subject invention, on the other hand, can deal with the packages in the physical level. The methods can be used to infiltrate any unwanted devices. Even the data can be accessed or prevented in the bit level. It is impossible for an attacker to circumvent this type of defense because the attacker must have not only physical access to the system, but also depending on the casing of the device he/she must have technical knowledge at the mechanical and electrical level. The method/system can detect abnormal behavior in the communication, and it can be used for deep packet inspection. Also, the method/system is transparent to the actual user and flexible; it does not consume system resources and does not hinder host performance.

Embodiments of the subject invention provide significant advantages compared to related art methods of malicious, external device detection. Based on the related art, if an unknown external device (e.g., USB device) is plugged into a computer system, there is little to no means for the user to detect let alone prevent malicious behavior spawned from the unknown device. Embodiments of the subject invention allow a user to insert any unknown USB-powered device into a computer system to detect malicious behavior, should any exist, on the unknown device. The benefit of being hardware-based is that malicious activity cannot be hidden at the hardware level, meaning that all malicious activity of the device would be detectable. Further, embodiments of the subject invention introduce a new field in hardware security. There is no real means in the related art to dynamically analyze behavior of unknown devices through hardware.

Embodiments of the subject invention can be used with critical systems that are being accessed internally through peripheral devices. Embodiments can even be used to complement existing security solutions in insider threat detection analysis. Embodiments of the subject invention provide the extra benefits of being OS-independent (can be easily applied to any device despite the OS installed on it) and hardware-based (can be trusted even in the presence of software-based compromised devices).

USB is the most powerful interface on a computing platform contrary to its underestimated power of flexibility. Indeed, organizations are investing in systems for network security for preventing attacks from outsiders; however, USB usage (where ability of turning into a network interface is only one out of many capabilities of it) is under the mercy of its user with its innate vulnerable nature. Thus, USB is a weak interface and strong interface at the same time for the use of an insider. To address these issues, embodiments of the subject invention provide novel detection and prevention frameworks. For example, such a framework can be provided on a ZedBoard hosting a Zynq system-on-chip (SoC) from Xilinx. The power of Zynq comes from not only holding a dual core ARM processor (PS), but also utilizing a rich logic environment (PL) that can be served either for the use of the processor or standalone use. It is noted that field-programmable gate arrays (FPGAs) are widely used in military missions supporting a wide range of forces, including the Air Force, the Navy, and the Army. An ARM processor running a Linux desktop that resembles the PC under protection can be used. Around the processor, in the programmable logic part (PL), a configurable and flexible USB sniffer and an independent monitoring unit observing the data going through the USB connection can be implemented. Either the ARM processor or the Linux OS may be vulnerable to attacks, but the logic core monitors the USB communication and alerts the system administrator through an independent administrative channel so that reconnaissance can be done more efficiently.

Contributions of embodiments of the subject invention over the related art include, but are not necessarily limited to, the following:

- a novel USB communication sniffer as a detection and prevention framework on the PL part of Zynq SoC. The implementation can serve for high-level synthesis implementation well with small modifications.
- The hardware core is flexible for serving the needs related to the security policy of the organization.
- Because the design is fully transparent and isolated from the main system, it creates no performance related issues and no overhead in terms of consuming system resources.
- The design supports low speed, full speed, and high speed data transfers.
- Due to being just a physical addition to the system, it is independent of the OS of the host, and it can be further developed as a tamper proof defense mechanism.

Figure 2:
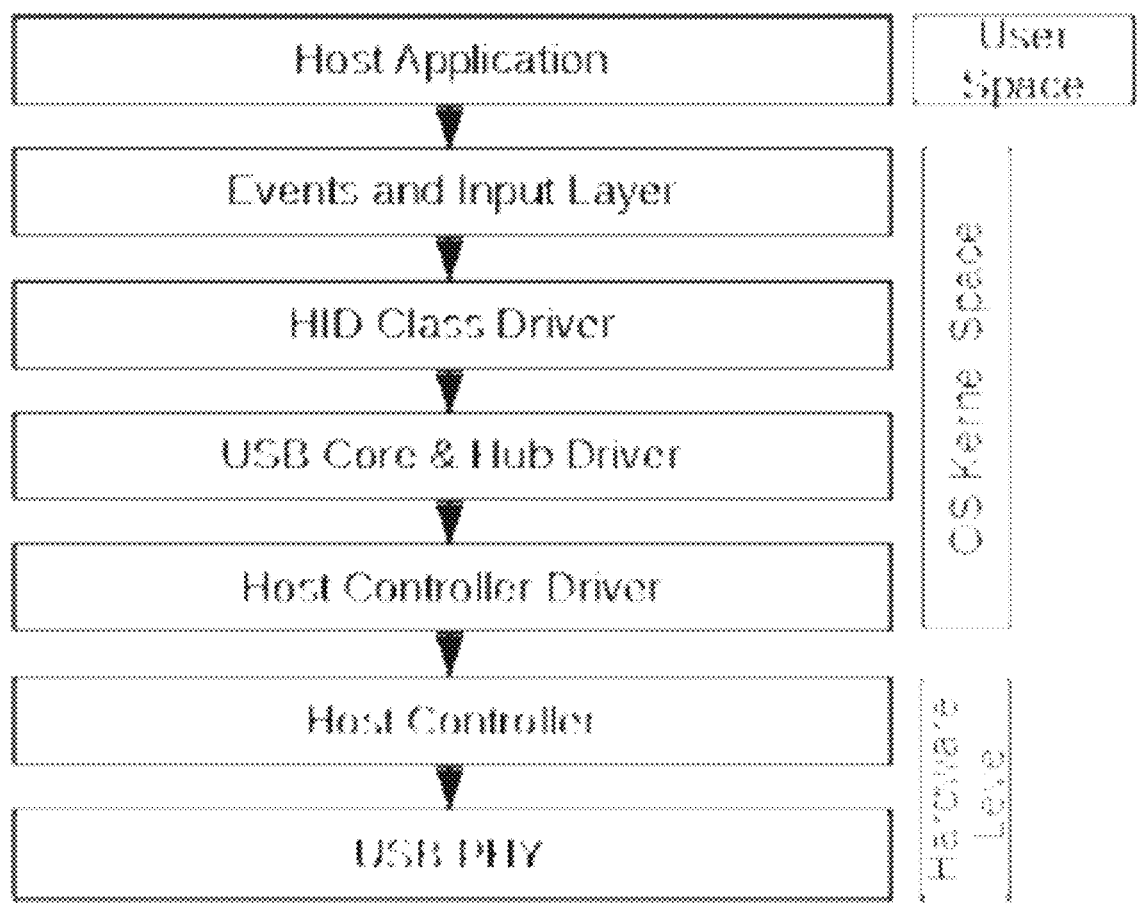
FIG. 2 shows the visited layers and loaded drivers when handling a simple USB keyboard in GNU/Linux OS.

In the first years of modern computing simple peripheral ports such as serial ports and parallel printing ports were enough to handle the data transfer between the PC and the external devices. Due to the increasing amount of data to be transferred and increasing capability of the peripheral devices with new functionalities, USB emerged. The introduction of USB was one of the greatest advances in communication technology. Recently, most devices are shipped with only USB and other input/output (I/O) connections like video or network connectors are often omitted. USB brings an undeniably rich user experience with its built-in functionalities, but with the power of being functional comes complexity. For example, for the Linux kernel, functionality with flexibility causes a complex layered architecture for handling the USB connection. FIG. 2 shows the visited layers and loaded drivers when handling a simple USB keyboard in GNU/Linux OS; when a USB device is connected to a computer, signal level change in the bus creates an interrupt at the Host Controller. After recognizing that change, the initial messaging starts. With suitable detection of the device, final required drivers are loaded and the user starts to use the device through the desired application. Being flexible comes with a vulnerable nature that makes USB a good source of attack. A smartly designed attack can open a serial port terminal over TeleTYpewriter (TTY) on a victim's PC with root access, or a USB can be programmed to mimic behavior of other devices in order to create fake inputs.

USB is designed to operate in a master-slave fashion where a host machine initiates and controls the communication between itself and the USB device. With the introduction of the USB on-the-go standard, USB devices that are traditionally thought to be slaves are able to act as hosts and can interact with slave devices on some occasions (e.g., smart phones). USB 3.1 standard also started a new era in USB history with extra capabilities like charging laptops while connecting displays. The new capabilities make the USB standard likely to stay in the near future.

The USB interface is the de facto peripheral interface in computer systems. From network to human interface device communications to printing to camera applications, USB is serving users well as it was aimed. The advancement in communication bandwidth, manufacturing capabilities, and physical connectors while holding backward compatibility means USB will be used for decades to come. Because of its popularity and ubiquity, the USB connection can be thought of as the main source for an insider threat because, if not secured, it is the most convenient way for getting large amounts of information from a computer.

The first USB transceiver designs were shipped with Macrocell Interface (UTMI) as a digital interface. Because UTMI was consuming a large area because of the pin count, a lower pin count version of that interface was introduced, UTMI+Low Pin Interface (ULPI). A host controller is the physical interface for connecting a device (e.g., USB) to a computer. It is basically the first level where the USB signaling is converted into register transfer level signals for the use of the operating system. Host Controller Interface (HCI) is the specification defining how the OS should interact with the host controller. In the case of USB, Open, Universal, Enhanced, and Extensible host controller interfaces (OHCI, UHCI, EHCI, XHCI) are the four mostly utilized specifications. The target of those HCIs is different USB specification versions, and embodiments of the subject invention can be used with host controllers.

When a device is first plugged into a computer, change of voltage levels creates an interrupt assertion in the host controller. The controller identifies the specification version of the device, and when the device specification version is identified the initial message exchange starts. In USB communication, the slave cannot do anything until the master asks.

- First message blocks: The host asks for the "Device Descriptor" from the attached device. The address of the device is initially 0 by default. The device descriptor is the first crucial step for identifying the device type.
- Second message blocks: Host identifies the number of interfaces the device has. Additionally, the host assigns an address to the attached device. The interfaces can be thought as the definition of capabilities that the attached USB device has. For example, a simple webcam device has camera and microphone capabilities, and those require different interface drivers. With these messages the host learns about the device by requesting configuration descriptors, interface descriptors and endpoint descriptors as needed.
- Remaining message blocks: After getting all the capability information from the device, the OS loads the required drivers and applications start using the capabilities of the device in the way it is defined in the device driver.

There are four different kinds of USB packets—token, data, handshake, and start/end-of-frame packets—and four kinds of transfer types—isochronous, interrupt, control, and bulk packet transfers. Each packet is identified by observing the 8-bit packet identification (PID) field in the beginning of the corresponding packet. Packet transmission starts right after the transmission of synchronization bits. Synchronization bits are utilized for the use at the electrical level in order to align the data sampling clocks. In practice, PID is the first byte carrying information in a given USB packet.

Figure 8:
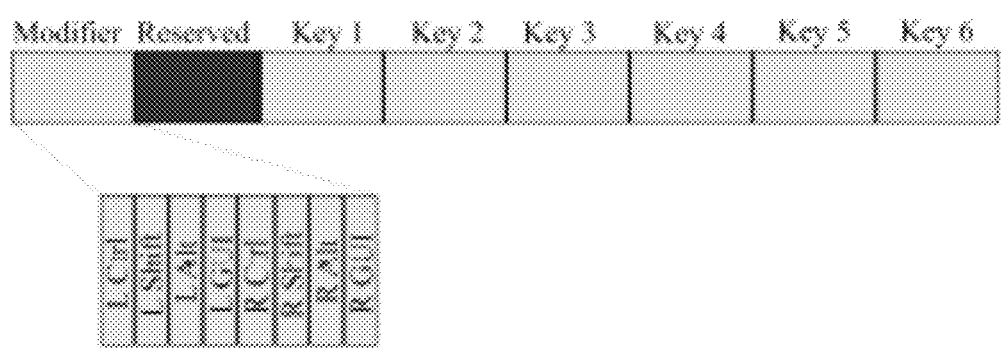
FIG. 8 shows a human interface device (HID) report for a standard keyboard.

Human Interface Devices (HIDs) are a subclass of USB devices that are designed for human input (e.g., keyboards, mice, gaming controllers, etc.). In order to communicate, the host machine will periodically request input information from the HID. The HID will then produce an HID report and encapsulate it in a USB packet. The report format for a standard keyboard is shown in FIG. 8. As shown, there is field in a keyboard report for a total of six concurrent key presses plus any modifier keys (i.e., SHIFT, CTRL, ALT, etc.). The reserved bit is ignored in the reports. When a user presses a key, the HID report will continuously include the key being pressed until the user subsequently releases the key. These HID reports can be used to collect data for a detection framework. From the report, information about which keys were pressed, how long they were pressed, and the speed at which the user can type can be gathered.

A common type of attack with embedded USB devices is referred to as a keystroke injection attack. In these attacks, the embedded device mimics a USB keyboard to inject malicious text (e.g., opening the terminal in Linux and deleting sensitive files). Two of the most common devices used to implement keystroke injection attacks are "Rubber Ducky" and "BadUSB", and both come with a pre-defined language for a user to easily create an attack script to embed in his/her USB device. The method to do so is discussed herein. First, the malicious actor designs the attack he/she wants performed. For example, assume an attacker wants to open a Linux terminal and remove the user's Documents folder (as demonstrated in FIG. 9). The attacker writes out the keyboard commands to do such an attack. To make sure the command is typed into the terminal, the attacker introduces delays between opening the terminal and typing the command. With the text created, the malicious actor must compile the malicious keystrokes ("payload") into an embedded USB device disguised as a common device (e.g., flash-drive, keyboard, etc.). To perform the attack, the attacker simply has to have the malicious USB device be inserted into the target computer. There are two common methods to do so: (1) a malicious insider plugs the device into the target machine; or (2) the malicious device is dropped near the target premises, leading to an unwitting insider mistakenly plugging the device into a target machine. Once inserted, the device begins performing the attack by sending an HID report with the current character in the payload. To the computer, this HID report simply looks like keystroke presses from a benign keyboard. To prevent onlooker detection, intricate attacks may wait for onlookers to disappear by delaying for an arbitrary time or waiting for the computer to enter rest-mode. Because the payload is embedded in a USB device, this attack is difficult to detect through normal means as a common anti-virus program cannot simply scan the file to determine if it is malware. Related art systems aim to analyze the typing behavior of the malicious device to distinguish itself from normal human typing. However, related art systems are still at initial stages and only detect simple attacks. Embodiments of the subject invention improve over such systems to show the viability to detect more advanced attack methods (e.g., more closely mimicking human typing behaviors).

The term "insider threat" is used to define the potential of data breach or harm to the assets of an organization due to the actions carried out by an employee or other person who has regular, authorized access to the machine(s). The intent of the employee can either be malicious such that he/she wants to harm the organization or it may be accidental harm. Insiders with malicious behavior can steal the confidential data of an organization or can create a backdoor for the outsiders for a more systematic and persistent attack.

An adversary (e.g., insider) who has restricted access to a computing system can be considered. The adversary initiates physical attacks on the host such as inserting a completely forbidden or previously allowed but later modified USB device. The attacker has physical access to the system; however, entrance to the facility is controlled, so the attacker can alter the device hardware or firmware but cannot completely replace sub-systems with new ones. This type of adversary might exist in facilities where the computers' USB ports are directly reachable. Additionally, computers can be protected by BIOS passwords and the computer can be initialized by a live operating system after taking required steps to change the BIOS settings. Network connections to the computers are allowed, and this creates another attack surface for the hosts. The ultimate target of the attacker can be either to extract data from the host device or suspend the system.

An attacker can take the following specific actions in order to be successful:

Modified device insertion. The adversary can plug in or insert a previously allowed but later modified USB device. BadUSB or USB devices with modified firmware fall into this type of attack.

Unauthorized Devices. This type of device can be used after eluding the software related security barriers. An example of this type of attack can be starting the host with external boot option so that the attacker can run a live OS in the victim host.

Access manipulation. The attacker can modify the firmware of the USB devices such that he/she can alter the capabilities of the device. USB device functionalities other than usual human interface device or mass storage device fall into this type of attack. Among these are added microphone, headphone, or network functions to the device. Super-human typing, e.g., rapid key strokes and rapid scrolling also fall into this category.

In an embodiment of the subject invention, there is a USB data sniffer implemented in the logic part of an FPGA. An ideal way of sniffing the data packets on the bus is transforming them into lower speed digital signals like UTMI or ULPI packages. For example, the USB data can be turned into ULPI signals. Based on the level change in the control signals, the data capture between host and the device is initiated. The USB enumeration process can be observed by utilizing finite state machines accordingly. Any kind of descriptor supplied by the USB device is stored, and the rules supplied by the system administrator are also stored in the logic part. The communication interface between the administrator and the system can be any of the current communication protocols. For the sake of security it is advised that communication should be other than that used in the entire organization for networking. For example, switches and the LEDs on the board can be used. The rules are input by the administrator in order to allow or block a certain type of devices. These rules can be manufacturer IDs and the product IDs or they can be specific interface descriptors like keyboards, mice, printers, mass storage devices, and so on. When the rule matches with a property of a connected USB device the design detects it and disrupts the communication, namely, it resets the communication. The best place for utilizing such a design is the host controller, where every connection reaches out there before being served by the operating system.

Figure 3:
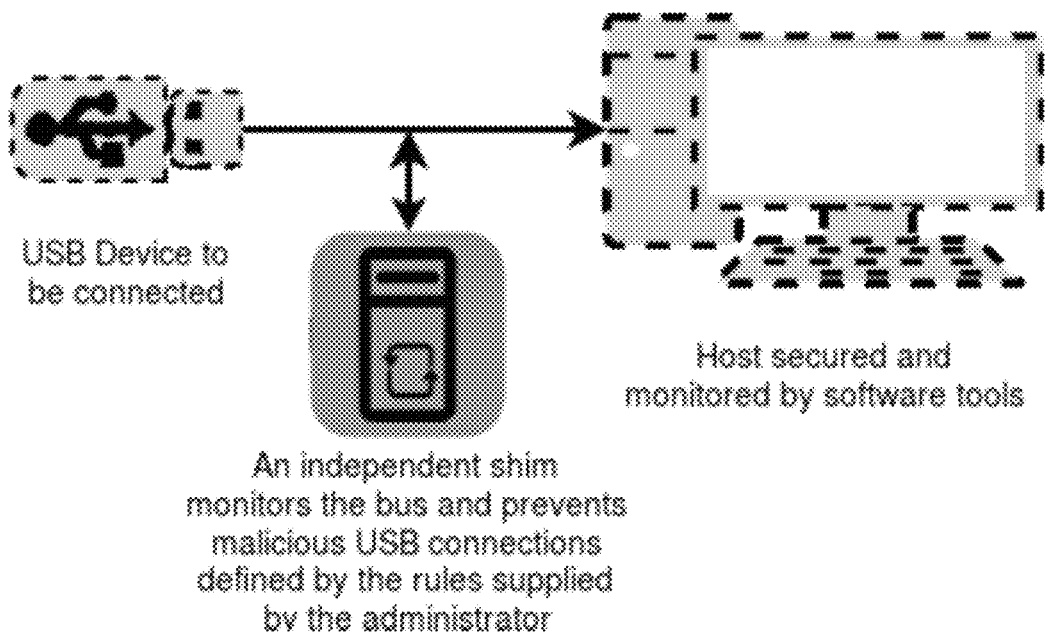
FIG. 3 shows a block diagram of a system according to an embodiment of the subject invention.

FIG. 3 shows a block diagram of a system according to an embodiment of the subject invention. Referring to FIG. 3, the PC is the computer that is protected by the organizational security policy, the USB device is the device that will be attached to the PC, and the shim icon at the lower side represents the control unit that resembles the system security administrators in practice. In a specific example, monitoring can be done via Logic Analyzer and control can be carried out via switches and buttons on the ZedBoard. ZedBoard from Digilent was used to perform tests. ZedBoard's Zynq has a hardly implemented ARM processor (PS) core with a high speed USB interface attached to it. The built-in USB interface of the Zynq SoC lends to implementation on the ZedBoard, but the USB interface of the processor cannot be reached from the logic part (PL) of the FPGA due to the limitations brought by multiplexed input/output (MIO) and extended MIO (EMIO) configuration options, by default design of the SoC. As a solution to that problem, an external USB physical layer USB3300 PHY can be utilized. USB3300 is a USB2.0 compliant USB PHY that is widely used in commercial products.

VHDL can be used for programming the FPGA and verification can be carried out by tests describing various scenarios directly on the hardware via Vivado integrated logic analyzer (ILA). In order to make the implementation hassle-free some points should be clarified related to hardware design issues.

Signal Integrity (SI) Issues. For a successful communication between the ZedBoard and the USB3300 evaluation board, one should be careful about the SI related issues. Because the USB PHY interface is using a clock of 60 MHz frequency, in order to mitigate the SI related problems a custom board targeting the most possible shortest signal trace was designed. Long connections done with jumper cables can be problematic. On the other hand, ZedBoard is shipped with serial 200Ω resistors placed on the general purpose test connectors. In order not to cause a decrease in the signal strength, these resistors can be replaced by 0Ω resistors.

ZedBoard configuration. The processor part of the Zynq can be configured with the ability of running a full featured Linux Desktop. The Linux kernel used was supplied by Xilinx. The root file system picked was the Linaro desktop (a debian based Linux distribution), which is known to be supporting ARM devices. The final design demonstration included a Linux desktop with a valid USB interface on the processor part and an active USB packet sniffer on the logic part controlled and monitored via switches and LEDs.

In the PHY part, observing a level change in "data direction" pin, PID data can be captured. Captured PID type triggers a finite state machine which gives data packets to the output of the module. Those outputs are fed into another finite state machine so that the enumeration process is observed and validated successfully. After observing the packets the system can infer the addresses of the USB devices, vendor IDs, device IDs, number of endpoints, type of endpoints, etc. If an administrator wants to prevent or inhibit a particular type of device or endpoint, he/she can define rules through the configuration input.

Figure 11:
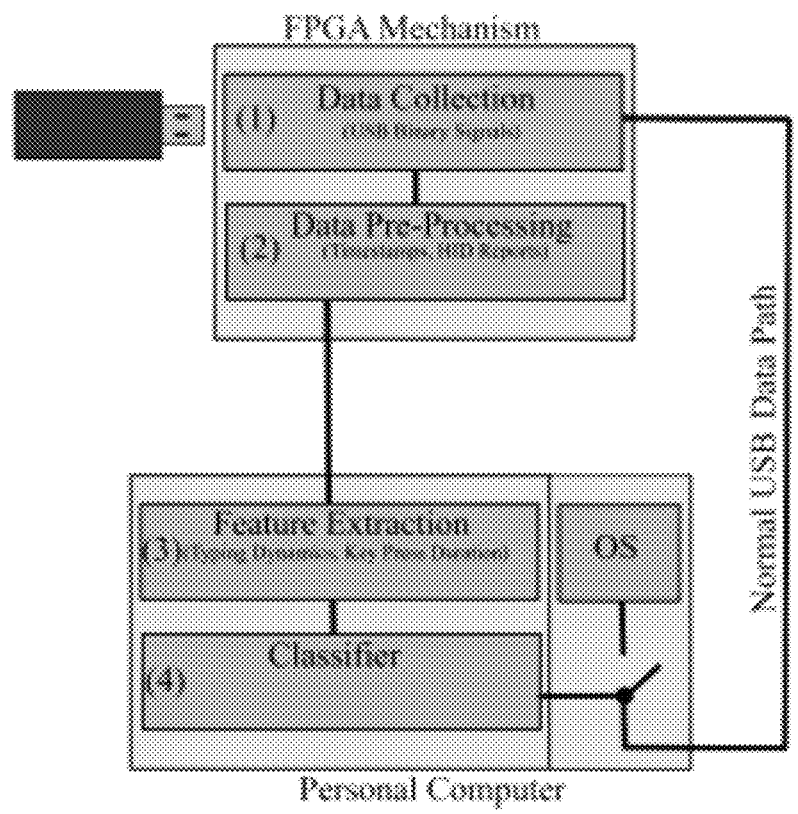
FIG. 11 shows a block diagram of an architecture according to an embodiment of the subject invention.

FIG. 11 shows a block diagram of an architecture according to an embodiment of the subject invention. First, a USB device can be inserted into the hardware-based data collector where the USB signals are sent to the target computer and also copied for processing. The data pre-processor recreates the USB packets and extracts the HID reports and timestamps. Typing dynamics are extracted from the HID reports to feed into the classifier which determines if the typing is truly human behavior. Each module of the architecture will now be described in more detail.

A. Hardware-Based Data Collector

A hardware-based mechanism between the USB-port and the computer can be used to collect USB traffic. The hardware provides similar functionality to a software-based USB sniffer. First, a USB device is connected to the FPGA board, which is further connected to the user's machine. From there, normal USB traffic flows from the USB device through the FPGA and into the user's machine. Utilizing a hardware mechanism such as this provides two distinct advantages. First, the hardware cannot be spoofed as it collects data at the USB physical layer. It is possible to subvert or tamper data collected by software sniffers. However, data is collected from the physical layer signals created by the USB device, which is not susceptible to OS-level obfuscation means. Second, by using a separated piece of hardware for data collection and pre-processing, an entire segment of computation is removed that would be normally performed on the host computer, thereby saving resources for classification and detection.

B. Data Pre-Processor

The data pre-processor takes incoming binary from the data collector and recreates the USB data packets. With the recreated USB packets, the framework extracts information about the device (e.g., device ID, frequency of packets sent, the data of each packet). What is being typed (HID reports) and how fast the device is typing (time stamp) can be focused upon. This allows a feature set to be produced from typing dynamics to train a classifier.

C. Feature Extraction

A number of time-based features can be analyzed to determine what is effective at detecting USB devices that mimic human typing behavior. Four features that can be extracted will now be discussed in detail.

1. Key Transition Time (KTT)—The key transition time (KTT) is calculated for every keystroke (i) by taking the difference of the time stamp ($t_i$) of the keystroke prior ($t_{i-1}$). Because there is no prior keystroke to compare for the first sampled keystroke, $ktt_0$ is given a value of 0. The equation for extracting the KTT feature is as follows.

$$ktt_i = t_i - t_{i-1} \quad (1)$$

2. Duration Held (D)—This feature defines how long a key was held. To obtain this, the HID reports can be scanned for the first instance of a keypress. Then, all sequential USB packets can be scanned until the keypress is removed from the report. The difference in time stamps between the report with the keypress removed and initial report gives the duration the key was held. The equation is as follows.

$$d_i = t_{keyReleased} - t_{keyHeld}, \quad (2)$$

3, 4. Standardized Features (KTT, D)—As additional features, features 1 and 2 can be normalized. This is done by taking the mean (μ) and standard deviation (σ) of a feature vector (X=<x, x, . . . >). Each value in the normalized feature vector is then calculated through the standardization equation:

$$\|x_i\| = (x_i - \mu)/\sigma \quad (3)$$

A high-precision model can be focused on such that a model that correctly predicts every malicious USB device, but also believes the user is a malicious USB device as well would not be considered. To avoid this, an analysis of features can be performed to determine which features best work with a model to obtain as much precision as possible.

D. Minimum Threshold Whitelist

Embodiments of the subject invention classify malicious USB key strokes that mimic human behavior. However, it is unnecessary to classify every malicious USB keystroke injection attack. Before any further analysis and classification is performed, the device must meet a minimum KTT threshold. All keyboard devices on a computer are put through this scan and any malicious actor who does not meet this minimum threshold are blocked. With the work done by USBlock, the best threshold to implement can already be known. Any device that types faster than 80 ms between keystrokes has been shown to not be human in nature, so a threshold of 80 ms can be implemented because there is no point in classifying malicious devices that do not mimic human behavior. If the attacker wishes to perform the attack as quickly as possible, time is wasted in attempting to classify the device. Therefore, this minimum threshold can be used to remove the threat posed by the attacker as quickly as possible. However, there are certain benign devices that would also not meet this minimum threshold (e.g., two-factor authentication keys). For this, a simple whitelist can be added to permits such devices.

E. Classifier

The extracted features can then be placed into a classifier to determine if the device is malicious or benign. In the evaluations, a number of classification models (decision tree, random forest, Naive Bayes, k-nearest neighbors, and support vector machines) were tested to determine which model best fits the data based on a number of criteria (e.g., accuracy, precision, ROC curve, score time, etc.). The results of such evaluations will now be discussed.

Feature analysis was performed on the feature set of typing dynamics. Once a feature ranking was obtained, model selection was performed on a sample of classification algorithms (e.g., Decision Tree, Random Forest, Naive Bayes, k-nearest neighbors, and support vector machine). With the best overall model chosen, a comparative analysis as performed where the proposed USB-Watch detection framework and related art systems were tested against real-world attack scenarios to evaluate which detection framework performs the best.

Embodiments of the subject invention using a USB-Watch architecture utilize a hardware mechanism to collect and process incoming USB traffic, which provides two distinct benefits. First, the use of a segmented piece of hardware ensures that the architecture is OS independent. If a device supports the USB protocol and has a USB host controller, USB-Watch will work on the system. Second, data collection and processing take up computation time with any security mechanism on a computing device. Detaching these processes to a segmented hardware like USB-Watch frees up resources on the host machine. This provides a lightweight solution to detection and minimizes overhead on the host system.

By utilizing a hardware mechanism placed between the USB device and the OS, USB-Watch can collect unalterable USB traffic. With machine learning, USB-Watch can successfully detect advanced keystroke-injection attacks that intentionally mimic human typing behavior. These combine to enable a detection framework that is lightweight and OS independent, which also distinguishes malicious typing dynamics with an ROC curve of 0.89. USB-Watch is believed to be the first framework to detect USB-based attacks through the utilization of an OS-independent and lightweight hardware mechanism. The data collector can be extended to analyze any USB-based device. Also, while hardware has been utilized for data collection and pre-processing, the architecture could be extended entirely to the hardware mechanism. Doing so would go toward building a truly "smart" USB bus that can automatically detect and prevent malicious activity before the device has time to establish a connection to the host machine.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

Experiments related to different use cases and their results will now be discussed. During the evaluation the following questions were addressed: (1) whether the packet inter-arrival times can be measured in order to detect fast key stroke-based attacks; (2) if the USB device can be identified based on advertised descriptors; (3) what the resource consumption of the framework on the FPGA will be; (4) how can the communication be hindered when a malicious behavior is noticed; (5) how can the design be verified; (6) how can a testbed be crafted; and (7) how the framework is not affected by the OS of the host.

Figure 4:
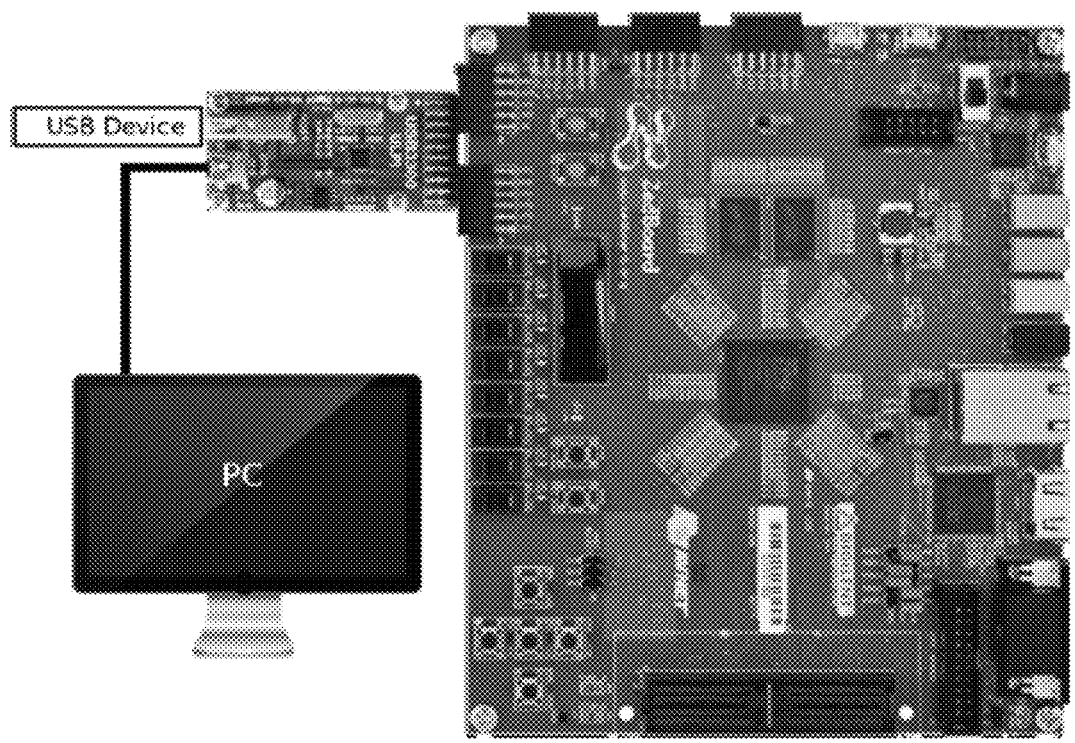
FIG. 4 shows an image of a testbed setup for evaluation of a framework.

FIG. 4 shows an image of a testbed setup for evaluation of a framework, in which USB3300 is connected to the Zynq board via a custom interconnect board. The final implementation of the design was realized on a combination of ZedBoard and the USB3300 evaluation board as shown in FIG. 4. The USB device is to be connected to the USB3300 PHY. The USB port of the computer is also connected to the USB3300 through a secondary connector. PHY is configured by the logic part of the SoC and was assigned to be in the bypass mode.

Figure 5:
FIG. 5 is a screen capture after a USB bus is disrupted on a PC running Windows 10.

In order to implement a fully functional detector, the design should be located in the host controller. Although the design cannot be thought of as a USB bridge, it can still prevent or inhibit USB from connection by disrupting the USB bus. As USB specification points out, USB devices can be put into reset mode by asserting SE0 signal state on the bus. This can be achieved by writing 0x50 to the Function Control register of the PHY. FIG. 5 is a screen capture after the USB bus is disrupted on a PC running Windows 10.

Figure 6:
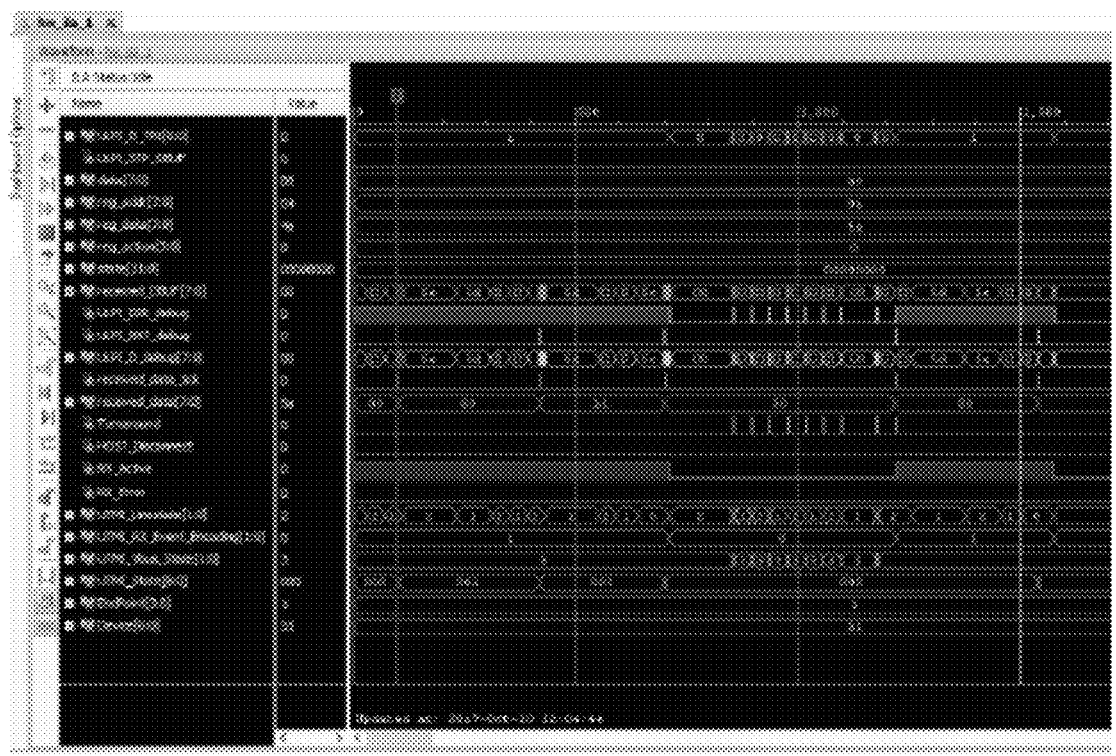
FIG. 6 shows an image of an integrated logic analyzer output waveform during design verification.

The design was verified by conducting hardware level simulations via integrated logic analyzer (ILA) as seen in FIG. 6 in conjunction with the usbmon (also displayed herein as "USBmon") dynamic kernel module. Verification of the state machine based packet processing was done by the help of GNU/Octave scripting language. The scripts were written in a way to simulate the hardware structure for easiness and consistency of verification. FIG. 6 shows an image of an integrated logic analyzer output waveform during design verification.

A first use case was a realization of the peensy attack, in which the attacker loads a programmable USB device with a malicious file and rapid keyboard entries via creating a keyboard interface. This combination makes the attack highly destructive, and the attack can occur either on insider's own PC or the attacker can infect an unattended PC quickly. To realize this experiment, the Teensy board was programmed to mimic a keyboard in such a way that it sends malicious commands to the PC. The script helps Teensy open a terminal on Linux, modifies the .bashrc file and closes the terminal. Steps are shown below:

Send a Ctrl+Alt+T combination to the PC. In GNU/Linux OS this opens a terminal window.
Send echo Halias lsclone=ls">>/.bashrcII command as a payload that creates an alias named lsclone, basically a command which mimics ls command.
Send ALT+F4 or Ctrl+D key combination so that the terminal is closed.

In order to create a defense for such rapid keyboard stroke attack, a histogram of the inter-arrival times of the key strokes was created. If the frequency or number of the rapid keystrokes exceeds a previously defined threshold an alert is created. The rationale behind this defense is that USB HID devices are transmitted as interrupt data packets, and maximum frequency for interrupt packages is 1 kHz in modern OSs. A key is composed of two packets, one for hit the key and the other is to release the key. In theory, one can send 500 characters per second with a programmed keyboard. This simple attack takes around 600 milliseconds (ms), of which some or all is the waiting time for the terminal to be opened. The idea behind the experiment is demonstrating that an employee with a malicious intent can insert some malicious code to the computer of a colleague by only inserting a USB device in a very short time. During the experiments, it was realized that Teensy introduced itself as a keyboard with two additional interfaces while an ordinary USB keyboard introduces only one interface that defines itself as a HID-Keyboard device. The same experiment was replicated with the Rubber Ducky, and Rubber Ducky successfully introduced itself as a keyboard device. That makes Rubber Ducky a tough target for defense.

Example 2

In another experiment, different types of devices and interfaces were attempted to be identified. Because it creates a very large attack surface the USB network interface to be identified was chosen. A network USB adapter was inserted in order to observe the enumeration process. The device introduced itself with interface class and subclass codes as FF, which corresponds to a vendor specific class definition. It was observed based on the device ID and vendor ID, it was a device manufactured by AX88179 Gigabit Ethernet devices from ASIX Electronics Corporation. For preventing (or allowing) that type of device, a filter to identify that vendor and device ID was created. Hence, the USB device with that vendor ID was prevented when plugged in.

Due to the nature of its open structure, the solutions in the related art are based on modification of the Linux kernel. However, for insider threat detection, identification, and prevention, it should be kept in mind that around 50% of companies run a Windows OS. Due at least in part to well-defined USB and USB driver specifications, embodiments of the subject invention are OS independent. All of the experiments were conducted in not only Linux, but also in a Windows OS.

Figure 7:
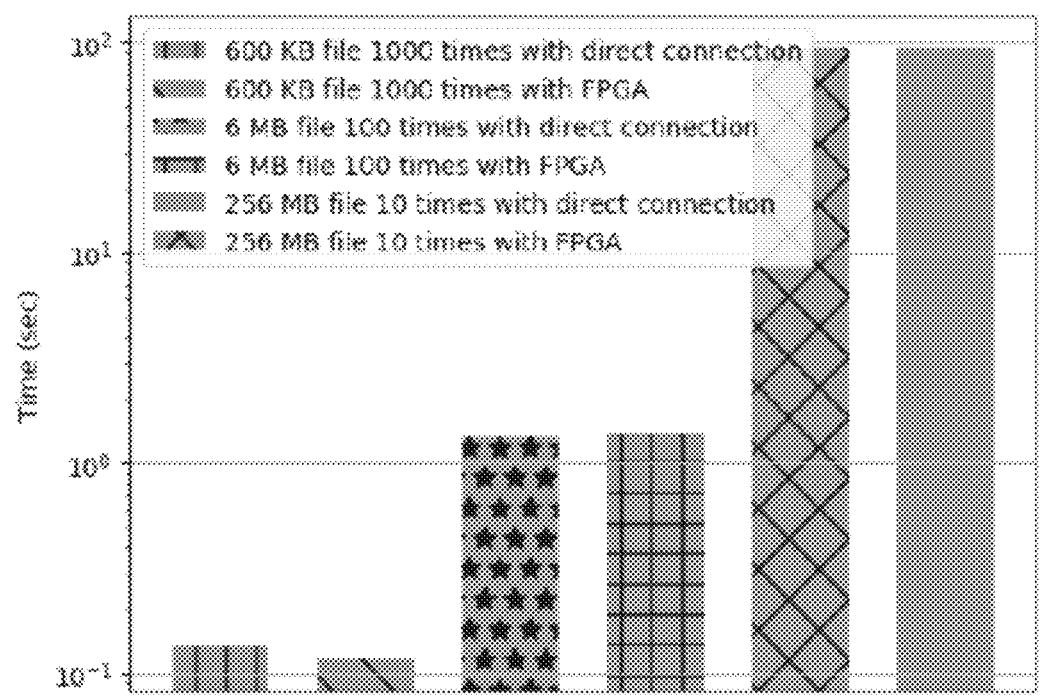
FIG. 7 shows the average time for sending different size files from a PC to a USB flash disk with FPGA and without FPGA.

1) Effects on data bit rate: Because the design was purely based on hardware flow, it does not have a direct effect on communication bit rate. In order to observe the overhead of the framework on the effective bit rate, files were transferred from a host to a USB mass storage device. FIG. 7 shows the results of file transfers with three different file sizes. In the experiments files of sizes 600 KB, 6 MB, and 256 MB were transferred. The mean of the duration of the transfers are plotted in FIG. 7. Referring to FIG. 7, it can be seen that the design according to an embodiment of the subject invention does not introduce a significant latency in packet transmission.

2) Resource Allocation on the FPGA: In this section, the resource allocation of the FPGA design is discussed. The amount of resources consumed in the Zynq SoC is shown in Table 1. Achievable maximum clock frequency is out of discussion because the USB PHY used had a fixed 60 MHz clock. Extending the rule table would introduce a slight increase in the resource allocation. For an increase in the number of rules, a block RAM utilization can be used. Resource utilization results show that extending a USB host controller with such capabilities is highly feasible and beneficial.

Hooking is the process of altering the normal behavior of an operating system. This is typically done by intercepting OS calls or events to output custom code (e.g., output "Hello World!" every time a device is inserted). A common method for sampling USB-traces is through the USBmon tool. In the Linux Kernel, USB traces are sent through a buffer which USBmon hooks into this buffer and outputs relevant trace information (i.e., timestamp, device ID, device bus, etc.). Through the use of system hooks, it is possible that an attacker may maliciously alter USBmon or other related hooks to not output specific USB device information. Should such an attack take effect, related art systems become effectively useless as the attacker can simply hide the USB device from detection schemes that utilize USBmon.

TABLE 1

| Resource Usage in the FPGA. | |
| --- | --- |
| Resource Name | Usage (count) |
| Slice LUTs | 785 |
| LUT as logic | 497 |
| LUT as Memory | 288 |
| Slice Registers - Flip Flops | 390 |

With a novel hardware-based mechanism that can be referred to as USB-Watch, embodiments of the subject invention can overcome this limitation. Because the data is collected in hardware, it is unfeasible for an insider threat to alter incoming USB data packets from a malicious device, thereby obtaining the true output from a device.

Example 3

Related art systems in classification of malicious USB devices specify that the malicious USB device is assumed to act distinctly different from normal human behavior (i.e., vastly different typing patterns). Mulliner et al. establish a simple method to prevent malicious USB devices by adding a block for any unknown device typing faster than 80 ms as no human can type faster than that (C. Mulliner and E. R. Weippl, "Usblock: Blocking usb-based keypress injection attacks," in Data and Applications Security and Privacy XXXII: 32nd Annual IFIP WG 11.3 Conference, DBSec 2018, Bergamo, Italy, Jul. 16-18, 2018, Proceedings, vol. 10980. Springer, 2018, p. 278.). This work shows it is still possible for an attacker to develop a smarter USB device that subverts these prevention schemes. No known work has been done to determine effective methods to detect a USB device that attempts to mimic human behavior. To show the simplicity of such an attack, a malicious device was developed and was aimed to subvert related art systems. The outline of this attack is described in FIG. 10. A simple Python script was developed that writes the Rubber Ducky attack file that the attacker can use to inject the payload. The script takes in the text used for the attack and implements a delay between each typed character. The delay can have a custom lower/upper bound to more effectively mimic human behavior. For the purposes of the analysis, a lower bound delay of 100 ms and an upper bound of 150 ms were used. This ensured the USB device did not type faster than 100 ms per keystroke so that the device types slow enough to subvert static threshold blocks. The 150 ms upper bound was chosen so that the typing speed was not too slow as to impact the attack itself (i.e., being detected by a human observer, text being interspersed with other keystroke input).

This random delay was implemented using Python's random number generator, which utilizes the Mersenne Twister (MT) algorithm. This algorithm was used as it comes with a variety of advantages an attacker would find beneficial: (1) MT is used in most modern programming languages, making it ubiquitous to implement; (2) it utilizes a long period ($2^{19937}-1$) that is beneficial to not repeat cycles; and (3) MT passes many statistical tests of randomness (e.g., birthday spacings, random spheres, etc.). With these three benefits, an attacker can easily implement the mimicry attack with more than sufficient assumptions his/her mimic can deceive simple detection schemes.

Implementing this simple delay method is enough to fool related art detection systems. The only possible flaw with this method is the increased possibility of interference between the malicious device and the human typing on the target machine. However, the attack would likely still be able to perform properly if done within a reasonable time frame (e.g., 30 seconds) to minimize the likelihood of interference.

Example 4

To perform the evaluations, a combination of a Zynq ZedBoard and a USB3300 evaluation board were used for a hardware data collector as shown in FIG. 4. Both benign and malicious key presses were sampled to collect samples. Twenty-one samples were collected from both a user and a malicious device performing a variation of three behaviors: (1) typing as fast as possible for 30 seconds; (2) typing a predefined paragraph as fast as possible; and (3) typing the predefined paragraph while trying to limit typing errors. Behaviors (1) and (2) represent anomalous human behavior so that the model does not incorrectly label a human as a malicious actor. Behavior (3) captures normal human typing behaviors and malicious devices attempting to mimic human behavior. The combination of all three behaviors results in both a high accuracy and high precision for the model.

Figure 12:
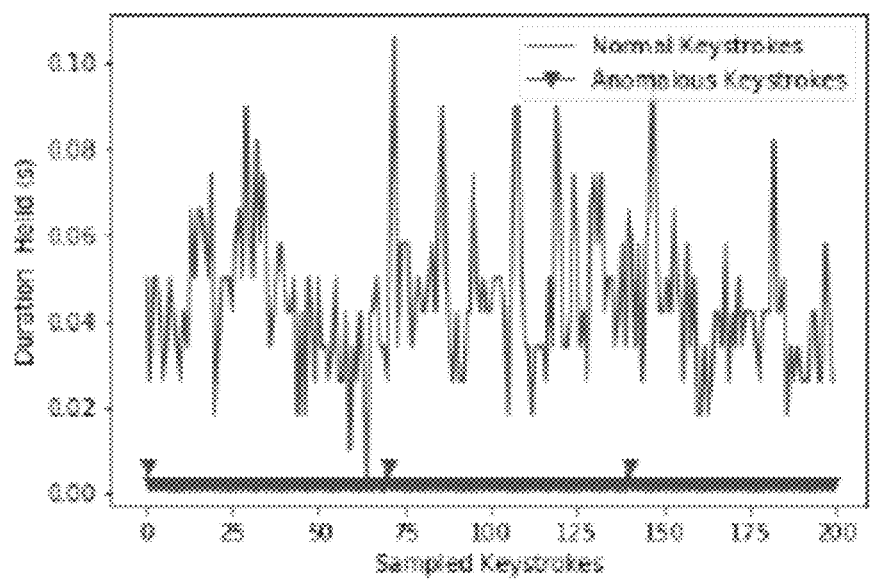
FIG. 12 shows a plot of keypress duration from benign and malicious samples.

First, an analysis of each proposed feature was performed in order to obtain information on how well each feature provides information to a classifier. With this, any unnecessary feature can be removed to minimize both classification time and model overfit. To do so, features were run through a recursive feature elimination that produces ranks of which features to prioritize. The features that were removed/prioritized are provided herein along with analysis to back up these findings below. The only feature removed was normalized key press duration, which happened due to an interesting outcome. All of the malicious devices tested simply sent a single HID report of whichever character is next in the sequence. There is no known ability to enforce a key to be held down. This means that the duration the key is pressed is simply how frequent the device is polled. When the feature is standardized, it loses all relevant information if compared with the original key press duration. This is due to there being very little standard deviation between malicious sampled packets which all produced a duration of about 2 ms. When standardized, the malicious key press duration lies squarely in the middle of a standardized benign key press, which is difficult to produce meaningful information. The remaining features are duration, KTT, and normalized KTT. The most information gained comes from duration as, through analysis, it was shown that existing devices used to inject malicious keystrokes cannot alter the duration a key is held. FIG. 12 shows a plot of keypress duration from benign and malicious samples. Referring to FIG. 12, this inability to modify the key press duration is what leads to the classification model according to an embodiment of the subject invention being so successful. Even when the malicious device produced a human-like key transition time, it was unable to mimic human behavior for key press duration. This behavior likely occurs from malicious USB devices loading the USB buffer with new information as soon as it is requested and then moving on to the next instruction in the payload. There is no known mechanism in these devices to simulate a keystroke being pressed. Even if an attacker gave a sequence of repeated characters, the USB host controller will read the characters as individual keystrokes. This fact allows successful classification of USB-based mimicry attacks that related art classification models fail to predict. However, classification cannot be performed on this feature alone as there are a few overlaps in duration when a human releases a key faster than 2 ms. If this feature alone were used for classification, it would produce a false-positive in the model. Therefore, the KTT and normalized KTT features can be included for better classification scores.

With features selected, an analysis of classification models was performed. The models chosen were—Decision Trees, Random Forest Ensembles, k-Nearest Neighbors, Naive Bayes, and Support Vector Machines. The best performing model in all criteria was chosen at the end.

The metrics used to evaluate the models were—accuracy, precision, recall, fit time, and score time. The first three metrics characterize how well the classifier predicts the target class. Good models correctly predict the target class (True-Positives ($T_P$)) and differentiate from other classes (True-Negatives ($T_N$)). Conversely, poor models falsely classify the target incorrectly (False-Negatives ($F_N$)) or classify other data as the target class (False-Positives ($F_P$)). Accuracy is defined as the number of correct classifications over the total number of classifications. The addition of precision and recall give a sense of how often a classification model incorrectly classifies data as the target class (precision) and how often the target class goes undetected by the model (recall). These three metrics are defined in Equations (4)-(6) below.

The other two metrics—fit time and score time—tell how fast a classification model performs. Fit time is defined as the time it takes to construct a model given the set of training data. Similarly, score time is how long it takes the constructed model to predict new data.

Figure 13:
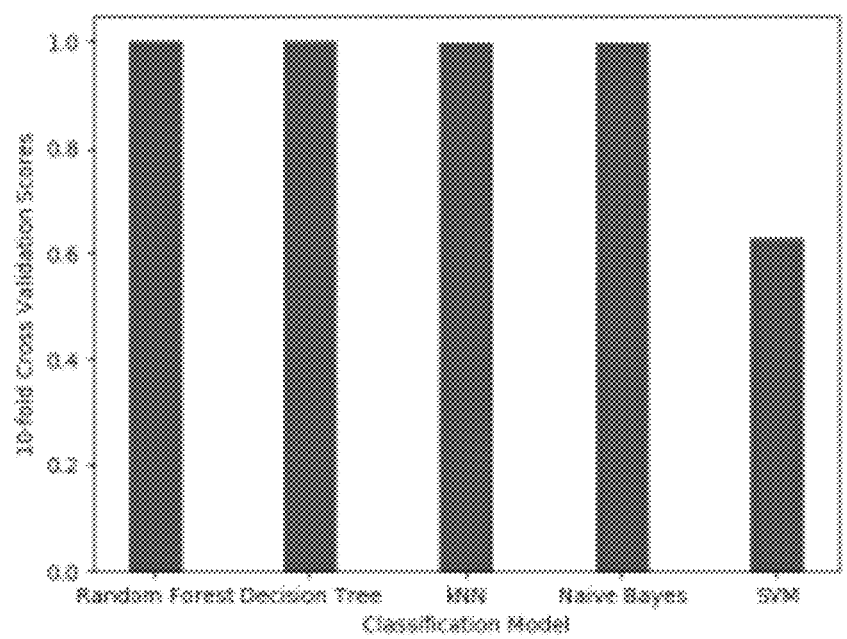
FIG. 13 shows a chart of prediction performance of classification models.
Figure 14:
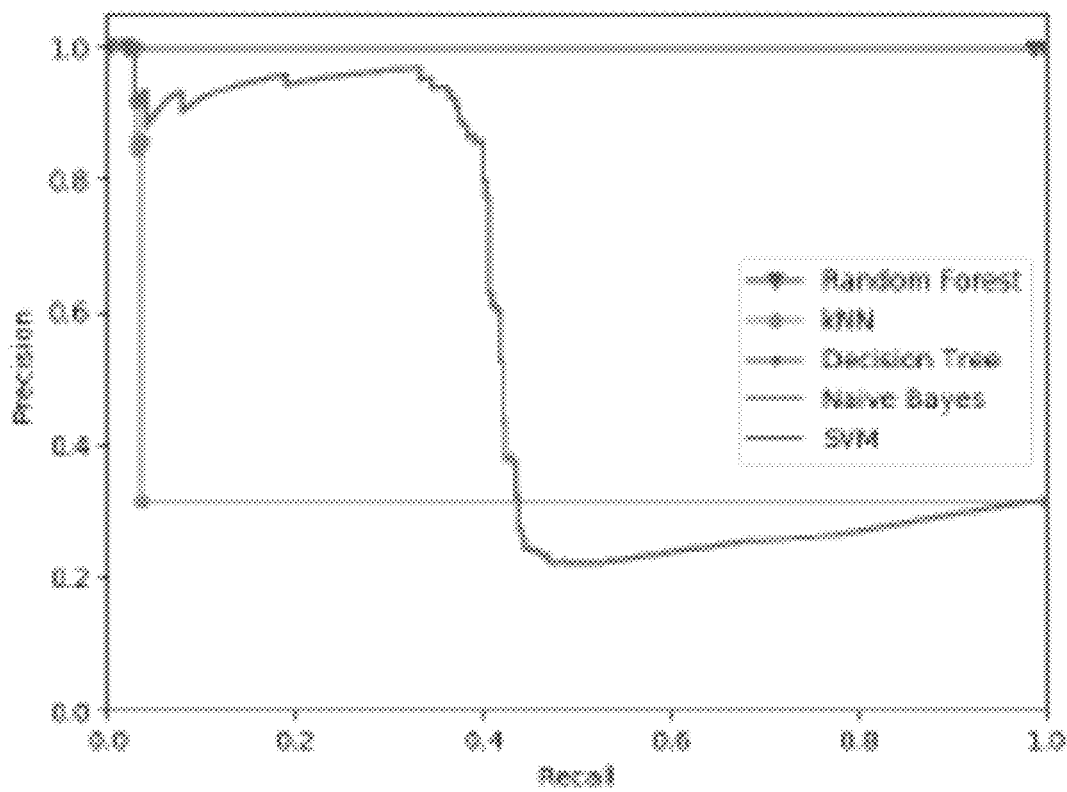
FIG. 14 shows a plot of precision/recall scores of classification models.

The first metric analyzed was the accuracy of the classification models. To analyze this, a 10-fold cross-validation, replicated 100 times, was conducted on each of the five tested classifiers. The results are shown in FIG. 13. FIG. 13 first compares the overall score of each model in cross validation. As shown, the Decision Tree, Random Forest, k-Nearest Neighbor, and Naive Bayes classifiers performed the best overall with near perfect scores. The SVM classifier performs quite poorly at a rate of 0.6. As for the performance of the SVM classifier, the results relate back to the sample data. The data was intentionally constructed to produce overlaps in both benign (typing as fast as possible) and malicious (mimicked human behavior) samples. Therefore, the SVM cannot successfully converge all of the data on a single dimension. From there, the precision and recall of the classifiers was analyzed. To do this, newly generated test samples with similar behaviors as the training samples were collected. Each classifier attempted to classify the test data and returned the probability to predict either malicious or benign behavior. Precision and recall were calculated by taking the percentage of false-positives (human typing classified as a malicious actor) and false-negatives (malicious actor going undetected in the model). These precision and recall scores were calculated over a range of classification thresholds then plotted in FIG. 14.

$$\text{Accuracy} = \frac{T_P + T_N}{T_P + T_N + F_P + F_N}, \quad (4)$$

$$\text{Precision} = \frac{T_P}{T_P + F_P}, \quad (5)$$

$$\text{Recall} = \frac{T_P}{T_P + F_N}. \quad (6)$$

Classification models that produce a high precision were prioritized first, as models believing normal behavior is malicious are not desirable. As shown, the Decision Tree and Random Forest classifiers produce high results whereas the kNN, Naive Bayes, and SVM classifiers produce quite poor results. For the latter classifiers, as the models try to capture all malicious devices, the model inevitably treats human behavior as malicious.

Figure 15:
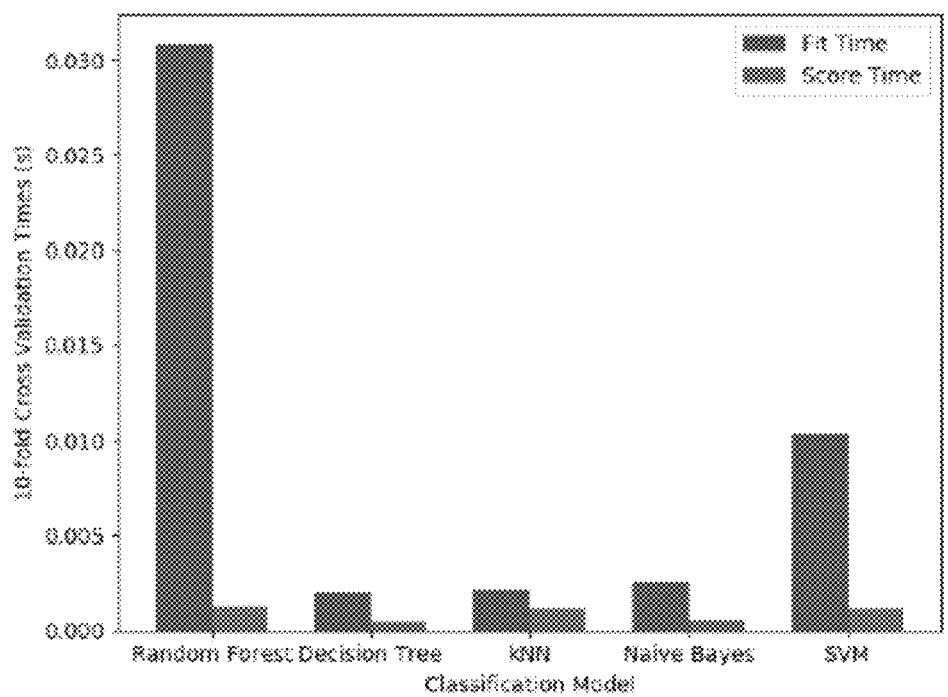
FIG. 15 shows a chart of time to fit and time to score of classification models.

FIG. 15 compares the time to fit and time to score the data for the remaining models. The higher the bar, the more time it takes to fit/score. As shown, the Random Forest takes considerably longer to fit the data, but comparable time to score new data. This makes sense as a Random Forest ensemble creates many Decision Trees with slight variances in which data to split on, meaning that there is a linear increase in complexity to train on data compared to a Decision Tree. When considering all the evaluation metrics (accuracy, precision/recall, computation time), the Decision Tree was finally chosen for the classification model. This was chosen because while normally a Random Forest model removes bias and overfitting that comes from decision tress, this does not appear to be the case in fitting the sample data.

Figure 16:
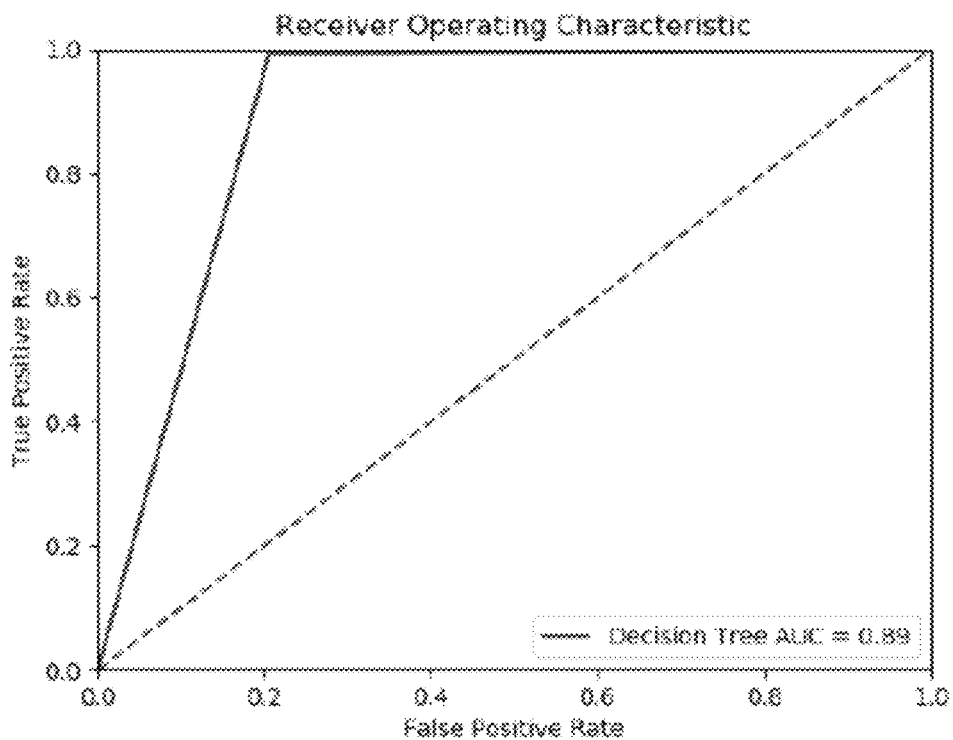
FIG. 16 shows a receiver operating characteristic (ROC) curve for a decision tree classifier according to an embodiment of the subject invention.

Indeed, the two models performed comparably in accuracy, precision, and recall. However, the Random Forest model takes considerably longer to fit/score the data, so instead the Decision Tree was used for evaluation. To test the viability of the Decision Tree model, a Receiver Operating Characteristic (ROC) curve was constructed. The ROC curve scores the model on its ability to differentiate proper signals (true-positives) from noise (false-positives) in the sampled data. FIG. 16 shows the ROC curve of a USB-Watch classifier using a decision tree, according to an embodiment of the subject invention. The dashed line shows a hypothetical model that simply guesses the output class. Any line above the diagonal indicates a predictive model that can properly infer the correct class from the input data—the higher the curve meaning a better classification model. As shown, the ROC area under the curve (AUC) of USB-Watch is 0.89, which indicates that the framework produces excellent prediction results.

A test suite of increasingly complex attack scenarios was constructed and simulated against USB-Watch and other frameworks. With the detection model created, its efficacy can be shown. Simulated frameworks of related art systems were created and tested against increasingly complex attack models to compare related art systems with USB-Watch. The frameworks evaluated, the attack models, and the results of how each framework performed against the attack models will be discussed.

1) Detection Models: Each model was created using the same data and tested against the same attacks that are described below.

"Prior 1"—This related art framework blocks USB keyboard packets that do not exceed a minimum key transition time threshold. We use the same threshold as described in USBlock of 80 ms ([4] C. Mulliner and E. R. Weippl, "Usblock: Blocking usb-based keypress injection attacks," in Data and Applications Security and Privacy XXXII: 32nd Annual IFIP WG 11.3 Conference, DBSec 2018, Bergamo, Italy, Jul. 16-18, 2018, Proceedings, vol. 10980. Springer, 2018, p. 278).

"Prior 2"—A One-Class SVM was used for this model and was trained using KTT and KTT features, similar to USBeSafe (B. L. Daley, "Usbesafe: Applying one class svm for effective usb event anomaly detection," Northeastern University, College of Computer and Information Systems Boston United States, Tech. Rep., 2016).

"USB-Watch 1"—This is a classification model according to an embodiment of the subject invention. The hardware-based data collector was replaced with software-based tools used in other works (e.g., USBmon from B. L. Daley, "Usbesafe: Applying one class svm for effective usb event anomaly detection," Northeastern University, College of Computer and Information Systems Boston United States, Tech. Rep., 2016).

"USB-Watch 2"—A framework with the hardware-based data collector according to an embodiment of the subject invention.

2) Attack Models: The frameworks were tested against a number of attacks with increased sophistication. Each attack model is described below. For each attack, the payload attempts to delete the user's Documents folder as described in FIG. 9. Additionally, to increase sophistication, each subsequent attack model implements all the methods introduced in prior attack models (i.e., Attack 3 has all the subversion features of Attack 1 and Attack 2).

Attack 1—This is a simple keystroke injection attack. Once plugged in, the USB device immediately executes the payload and types it as fast as possible. This attack is used as a baseline to demonstrate all the frameworks operate correctly.

Attack 2—To subvert human detection, this attack waits for 1 minute before executing the payload. Again, the payload is typed as fast as possible.

Attack 3—This attack attempts to mimic human typing dynamics by implementing a static delay of 100 ms between each typed character.

Attack 4—This attack uses random delays between an interval of 100 ms and 150 ms for each typed character.

Attack 5—Here, it is assumed that the target computer has a rootkit that falsifies USBmon outputs. A rootkit introduces a system hook to the system that removes any USB packet that matches a Rubber Ducky or BadUSB vendor ID from displaying in USBmon.

3) Results: With the attack models and frameworks defined, each attack model was evaluated against each detection framework. Because each attack model increases in sophistication from the prior, the attack that caused the detection model to fail will be detailed. Table 2 provides the complete results, with a checkmark meaning that the model successfully detected the attack and an X meaning the model failed to detect the attack.

TABLE 2

The ability of each detection framework to detect different attacks.

| | Prior 1 [4] | Prior 2 [6] | USB-Watch 1 | USB-Watch 2 |
|---|---|---|---|---|
| Attack 1 | ✓ | ✓ | ✓ | ✓ |
| Attack 2 | ✓ | ✓ | ✓ | ✓ |
| Attack 3 | X | ✓ | ✓ | ✓ |
| Attack 4 | X | X | ✓ | ✓ |
| Attack 5 | X | X | X | ✓ |

Prior 1—This framework failed after Attack 3 was introduced. Because the KTT threshold should not falsely claim human typing is malicious, the attacker can make an educated guess as to what delay should be implemented in the device to surpass the threshold check. In the test results, the minimum delay of 100 ms exceeded the KTT check of 80 ms, so the malicious device was allowed to operate.

Prior 2—The classifier based on KTT also began to weaken at Attack 3, but because Attack 3 has a static KTT, the classifier still performed relatively well. However, with Attack 4 introducing a random delay interval, the classifier began to classify the attack as human in nature.

USB-Watch 1—This model performed well against all mimicry attacks. This is due to the fact that all known USB injection attacks cannot mimic human key press duration. However, once the rootkit was introduced in Attack 5, the detection framework was simply unable to collect data from the attack and therefore could not even begin to classify the attack.

USB-Watch 2—The framework according to an embodiment of the subject invention performed well against all of the simulated attack models. It properly classified Attacks 1-4 like USB-Watch 1. However, because the hardware mechanism was used to collect the raw USB signals from the malicious device, this model properly classified Attack 5 even when the OS on the host machine is corrupted.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A system for the detection and inhibition of insider threats to a computing environment to which the system is connected, the system comprising:
   a hardware bus having instructions stored thereon that, when executed, perform the following steps:
      collect incoming data from incoming signals from an external device connected to the hardware bus, the collecting of the data comprising observing a level change in a data direction in of the external device in order to capture rocket identification (PID) data, the incoming data comprising the PID data;
      transform the incoming data from the incoming signals into Macrocell Interface (UTMI) or UTMI+Low Pin Interface (ULPI) data packages;
      perform pre-processing on the data packages to recreate protocol data packets of the external device and to obtain timestamp information and human interface device (HID) information about the incoming data from the incoming signals, the performing of the pre-processing comprising utilizing a first finite state machine to recreate the protocol data packets from the data packages and utilizing a second finite state machine on the data packets in order to observe and validate an enumeration process of the external device;
      extract feature information about the external device from the recreated protocol data packets;
      classify the external device as benign or malicious based on the extracted feature information;
      if the external device is classified as malicious, prevent the external device from transmitting the incoming signals to the computing environment; and
      if the external device is classified as benign, allow the external device to transmit the incoming signals to the computing environment.

2. The system according to claim 1, the feature information comprising information about at least one feature of keystroke-like actions of the external device, and
   the at least one feature comprising at least one of key transition time (KTT), duration held, normalized KTT, and normalized duration held.

3. The system according to claim 1, the feature information comprising information about at least one feature of keystroke-like actions of the external device,
   the at least one feature comprising key transition time (KTT), and
   the external device being classified as malicious if the KTT of any keystroke-like action of the external device is less than a first minimum threshold time.

4. The system according to claim 3, the first minimum threshold time being 80 milliseconds.

5. The system according to claim 1, the instructions of the hardware bus, when executed, further creating a whitelist of known benign devices having a key transition time (KTT) of less than a first minimum threshold,
   the feature information comprising information about at least one feature of keystroke-like actions of the external device,
   the at least one feature comprising KTT, and the external device being classified as malicious if the KTT of any keystroke-like action of the external device is less than the first minimum threshold time and the external device is not on the whitelist.

6. The system according to claim 1, the feature information comprising information about at least one feature of keystroke-like actions of the external device,
the at least one feature comprising duration held, and
the external device being classified as malicious if the duration held of any keystroke-like action of the external device is less than a second minimum threshold time.

7. The system according to claim 1, the feature information comprising information about at least one feature of keystroke-like actions of the external device,
the at least one feature comprising key transition time (KTT) and duration held, and
the external device being classified as benign if the KTT of all keystroke-like actions of the external device is greater than or equal to a first minimum threshold time and the duration held of all keystroke-like actions of the external device is greater than or equal to a second minimum threshold time.

8. The system according to claim 1, the external device being a universal serial bus (USB) device.

9. The system according to claim 8, the external device being a USB keyboard, USB mouse, USB storage device, or USB adapter.

10. The system according to claim 1, the classifying of the external device as benign or malicious based on the extracted feature information comprising using machine learning on the extracted feature information.

11. The system according to claim 10, the using of machine learning comprising using a decision tree, a random forest, Naive Bayes, k-nearest neighbors, or a support vector machine on the extracted information.

12. The system according to claim 10, the using of machine learning comprising using a decision tree on the extracted information.

13. A method for the detection and inhibition of insider threats to a computing environment to which a hardware bus is connected, the method comprising:
collecting, by the hardware bus, incoming data from incoming signals from an external device connected to the hardware bus, the collecting of the data comprising observing a level change in a data direction pin of the external device in order to capture packet identification (PID) data, the incoming data comprising the PID data;
transforming, by the hardware bus, the incoming data from the incoming signals into Macrocell Interface (UTMI) or UTMI+Low Pin Interface (ULPI) data packages;
performing, by the hardware bus, pre-processing on the data packages to recreate protocol data packets of the external device and to obtain timestamp information and human interface device (HID) information about the incoming data from the incoming signals, the performing of the pre-processing comprising utilizing a first finite state machine to recreate the protocol data packets from the data packages and utilizing a second finite state machine on the data packets in order to observe and validate an enumeration process of the external device;
extracting, by the hardware bus, feature information about the external device from the recreated protocol data packets;
classifying, by the hardware bus, the external device as benign or malicious based on the extracted feature information;
if the external device is classified as malicious, preventing, by the hardware bus, the external device from transmitting the incoming signals to the computing environment; and
if the external device is classified as benign, allowing, by the hardware bus, the external device to transmit the incoming signals to the computing environment.

14. The method according to claim 13, the feature information comprising information about at least one feature of keystroke-like actions of the external device, and
the at least one feature comprising at least one of key transition time (KTT), duration held, normalized KTT, and normalized duration held.

15. The method according to claim 13, further comprising creating a whitelist of known benign devices having a key transition time (KTT) of less than a first minimum threshold,
the feature information comprising information about at least one feature of keystroke-like actions of the external device,
the at least one feature comprising KTT, and
the external device being classified as malicious if the KTT of any keystroke-like action of the external device is less than the first minimum threshold time and the external device is not on the whitelist.

16. The method according to claim 13, the feature information comprising information about at least one feature of keystroke-like actions of the external device,
the at least one feature comprising duration held, and
the external device being classified as malicious if the duration held of any keystroke-like action of the external device is less than a second minimum threshold time.

17. The method according to claim 13, the feature information comprising information about at least one feature of keystroke-like actions of the external device,
the at least one feature comprising key transition time (KTT) and duration held, and
the external device being classified as benign if the KTT of all keystroke-like actions of the external device is greater than or equal to a first minimum threshold time and the duration held of all keystroke-like actions of the external device is greater than or equal to a second minimum threshold time.

18. The method according to claim 13, the classifying of the external device as benign or malicious based on the extracted feature information comprising using machine learning on the extracted feature information, and
the using of machine learning comprising using a decision tree, a random forest, Naive Bayes, k-nearest neighbors, or a support vector machine on the extracted information.

19. The method according to claim 13, the external device being a universal serial bus (USB) keyboard, USB mouse, USB storage device, or USB adapter.

20. A method for the detection and inhibition of insider threats to a computing environment to which a hardware bus is connected, the method comprising:
collecting, by the hardware bus, incoming data from incoming signals from an external device connected to the hardware bus, the collecting of the data comprising observing a level change in a data direction in of the external device in order to capture packet identification PID data, the incoming data comprising the PID data;

transforming, by the hardware bus, the incoming data from the incoming signals into Macrocell Interface (UTMI) or UTMI+Low Pin Interface (ULPI) data packages;

performing, by the hardware bus, pre-processing on the data packages to recreate protocol data packets of the external device and to obtain timestamp information and human interface device (HID) information about the incoming data from the incoming signals, the performing of the pre-processing comprising utilizing a first finite state machine to recreate the protocol data packets from the data packages and utilizing a second finite state machine on the data packets in order to observe and validate an enumeration process of the external device;

extracting, by the hardware bus, feature information about the external device from the recreated protocol data packets;

creating a whitelist of known benign devices having a key transition time (KTT) of less than a first minimum threshold;

classifying, by the hardware bus, the external device as benign or malicious based on the extracted feature information;

if the external device is classified as malicious, preventing, by the hardware bus, the external device from transmitting the incoming signals to the computing environment; and if the external device is classified as benign, allowing, by the hardware bus, the external device to transmit the incoming signals to the computing environment the feature information comprising information about at least one feature of keystroke-like actions of the external device, the at least one feature comprising KTT and duration held, the external device being classified as malicious if the KTT of any keystroke-like action of the external device is less than the first minimum threshold time and the external device is not on the whitelist, the external device being classified as malicious if the duration held of any keystroke-like action of the external device is less than a second minimum threshold time, the external device being classified as benign if the KTT of all keystroke-like actions of the external device is greater than or equal to the first minimum threshold time and the duration held of all keystroke-like actions of the external device is greater than or equal to the second minimum threshold time, the first minimum threshold time being 80 milliseconds, the external device being a universal serial bus (USB) keyboard, USB mouse, USB storage device, or USB adapter, the classifying of the external device as benign or malicious based on the extracted feature information comprising using machine learning on the extracted feature information, and the using of machine learning comprising using a decision tree on the extracted feature information.

* * * * *